(12) United States Patent
Gali et al.

(10) Patent No.: US 12,136,270 B2
(45) Date of Patent: Nov. 5, 2024

(54) VEHICULAR TRAILER ANGLE DETECTION SYSTEM FOR FIFTH-WHEEL TRAILERS

(71) Applicant: Magna Electronics Inc., Auburn Hills, MI (US)

(72) Inventors: Jyothi P. Gali, Rochester Hills, MI (US); Harold E. Joseph, Brampton (CA); Gajanan Subhash Kuchgave, Maharashtra (IN); Alexander Velichko, Toronto (CA); Guruprasad Mani Iyer Shankaranarayanan, Mississauga (CA)

(73) Assignee: Magna Electronics Inc., Auburn Hills, MI (US)

( * ) Notice: Subject to any disclaimer, the term of this patent is extended or adjusted under 35 U.S.C. 154(b) by 426 days.

(21) Appl. No.: 17/646,904

(22) Filed: Jan. 4, 2022

(65) Prior Publication Data

US 2022/0215670 A1    Jul. 7, 2022

Related U.S. Application Data

(60) Provisional application No. 63/199,514, filed on Jan. 5, 2021.

(51) Int. Cl.
*G06V 20/56* (2022.01)
*G06T 5/92* (2024.01)
*G06T 7/13* (2017.01)
*G06T 7/20* (2017.01)
*G06V 10/25* (2022.01)
(Continued)

(52) U.S. Cl.
CPC ............... *G06V 20/56* (2022.01); *G06T 5/92* (2024.01); *G06T 7/13* (2017.01); *G06T 7/20* (2013.01); *G06V 10/25* (2022.01); *G06V 10/44* (2022.01); *G06V 10/48* (2022.01); *H04N 23/698* (2023.01); *H04N 23/80* (2023.01); *B60R 1/26* (2022.01); *B60R 2011/004* (2013.01); *B60R 11/04* (2013.01); *B60R 2300/30* (2013.01); *B60R 2300/607* (2013.01); *B60R 2300/808* (2013.01); *G06T 2207/30252* (2013.01)

(58) Field of Classification Search
CPC ........................................... G06T 2207/30252
See application file for complete search history.

(56) References Cited

U.S. PATENT DOCUMENTS 5,550,677 A   8/1996 Schofield et al.
5,670,935 A   9/1997 Schofield et al.
(Continued)

*Primary Examiner* — Guillermo M Rivera-Martinez
(74) *Attorney, Agent, or Firm* — HONIGMAN LLP

(57) ABSTRACT

A vehicular trailer assist system includes a rearward viewing camera disposed at a vehicle that views a trailer hitched at a fifth wheel hitch at a bed of the vehicle. With the trailer hitched to the fifth wheel hitch at the bed of the vehicle, the vehicular trailer assist system, via processing fisheye-view frames of image data captured by the camera, transforms fisheye-view frames of image data captured by the rearward viewing camera into bird's-eye view frames of image data. The vehicular trailer assist system determines a region of interest (ROI) in a transformed bird's-eye view frames of image data that includes a region where the fifth wheel hitch is present. The vehicular trailer assist system, via a Hough transform that transforms the determined ROI from a Cartesian coordinate system to a polar coordinate system, determines a trailer angle of the trailer relative to the vehicle.

20 Claims, 11 Drawing Sheets

(51) Int. Cl.
  *G06V 10/44* (2022.01)
  *G06V 10/48* (2022.01)
  *H04N 23/698* (2023.01)
  *H04N 23/80* (2023.01)
  *B60R 1/26* (2022.01)
  *B60R 11/00* (2006.01)
  *B60R 11/04* (2006.01)

(56) References Cited

U.S. PATENT DOCUMENTS

| | | | |
|---|---|---|---|
| 5,949,331 | A | 9/1999 | Schofield et al. |
| 6,690,268 | B2 | 2/2004 | Schofield et al. |
| 7,005,974 | B2 | 2/2006 | McMahon et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 9,085,261 | B2 | 7/2015 | Lu et al. |
| 9,205,776 | B2 | 12/2015 | Turk |
| 9,446,713 | B2 | 9/2016 | Lu et al. |
| 9,558,409 | B2 | 1/2017 | Pliefke et al. |
| 9,609,757 | B2 | 3/2017 | Steigerwald |
| 9,900,490 | B2 | 2/2018 | Ihlenburg et al. |
| 9,914,333 | B2 | 3/2018 | Shank et al. |
| 10,071,687 | B2 | 9/2018 | Ihlenburg et al. |
| 10,086,870 | B2 | 10/2018 | Gieseke et al. |
| 10,089,537 | B2 | 10/2018 | Nix et al. |
| 10,154,185 | B2 | 12/2018 | Sigle et al. |
| 10,160,382 | B2 | 12/2018 | Pliefke et al. |
| 10,179,543 | B2 | 1/2019 | Rathi et al. |
| 10,264,219 | B2 | 4/2019 | Mleczko et al. |
| 10,313,572 | B2 | 6/2019 | Wohlte |
| 10,332,002 | B2 | 6/2019 | Bliss et al. |
| 10,346,705 | B2 | 7/2019 | Naserian et al. |
| 10,407,047 | B2 | 9/2019 | Chundrlik, Jr. et al. |
| 10,452,931 | B2 | 10/2019 | Gupta |
| 10,532,698 | B2 | 1/2020 | Potnis et al. |
| 10,552,976 | B2 | 2/2020 | Diessner et al. |
| 10,567,705 | B2 | 2/2020 | Ziegenspeck et al. |
| 10,586,119 | B2 | 3/2020 | Pliefke et al. |
| 10,638,025 | B2 | 4/2020 | Gali et al. |
| 10,706,291 | B2 | 7/2020 | Diessner et al. |
| 10,733,757 | B2 | 8/2020 | Gupta et al. |
| 10,755,110 | B2 | 8/2020 | Bajpai |
| 11,702,017 | B2 | 7/2023 | Gali et al. |
| 11,861,878 | B2 | 1/2024 | Gali et al. |
| 11,875,575 | B2 | 1/2024 | Gali et al. |
| 2011/0050903 | A1 | 3/2011 | Vorobiev |
| 2014/0085472 | A1 | 3/2014 | Lu et al. |
| 2014/0160276 | A1 | 6/2014 | Pliefke et al. |
| 2014/0200759 | A1* | 7/2014 | Lu .............. G06T 7/73 701/28 |
| 2015/0002670 | A1 | 1/2015 | Bajpai |
| 2015/0217693 | A1 | 8/2015 | Pliefke et al. |
| 2017/0050672 | A1 | 2/2017 | Gieseke et al. |
| 2017/0217372 | A1 | 8/2017 | Lu et al. |
| 2017/0254873 | A1 | 9/2017 | Koravadi |
| 2017/0341583 | A1* | 11/2017 | Zhang .............. H04N 7/181 |
| 2018/0043933 | A1* | 2/2018 | Hu .............. B62D 13/06 |
| 2018/0211528 | A1 | 7/2018 | Seifert |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1 | 9/2018 | Diessner et al. |
| 2018/0341823 | A1 | 11/2018 | Gupta |
| 2019/0016264 | A1 | 1/2019 | Potnis et al. |
| 2019/0039649 | A1 | 2/2019 | Gieseke et al. |
| 2019/0064831 | A1 | 2/2019 | Gali et al. |
| 2019/0118860 | A1 | 4/2019 | Gali et al. |
| 2019/0335100 | A1* | 10/2019 | Chen .............. G06V 20/56 |
| 2019/0347825 | A1* | 11/2019 | Gupta .............. B60D 1/245 |
| 2020/0010018 | A1* | 1/2020 | Maruoka .............. B60R 1/003 |
| 2020/0017143 | A1 | 1/2020 | Gali |
| 2020/0334475 | A1 | 10/2020 | Joseph et al. |
| 2020/0346581 | A1* | 11/2020 | Lawson .............. B60R 1/0612 |
| 2020/0356788 | A1 | 11/2020 | Joseph et al. |
| 2020/0361397 | A1 | 11/2020 | Joseph et al. |
| 2020/0406967 | A1 | 12/2020 | Yunus et al. |
| 2021/0078634 | A1 | 3/2021 | Jalalmaab et al. |
| 2021/0127693 | A1 | 5/2021 | Tomita et al. |
| 2021/0170820 | A1 | 6/2021 | Zhang |
| 2021/0170947 | A1 | 6/2021 | Yunus et al. |
| 2022/0189052 | A1 | 6/2022 | Jalalmaab et al. |
| 2022/0212599 | A1 | 7/2022 | Gali et al. |
| 2022/0212668 | A1 | 7/2022 | Joseph et al. |

\* cited by examiner

VEHICULAR TRAILER ANGLE DETECTION SYSTEM FOR FIFTH-WHEEL TRAILERS

CROSS REFERENCE TO RELATED APPLICATION

The present application claims the filing benefits of U.S. provisional application Ser. No. 63/199,514, filed Jan. 5, 2021, which is hereby incorporated herein by reference in its entirety.

FIELD OF THE INVENTION

The present invention relates generally to a vehicular trailering assist system for a vehicle towing a trailer and, more particularly, to a vehicular trailering assist system that utilizes one or more cameras at a vehicle for determining trailer angle of the trailer relative to the vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A vehicular trailer assist system includes a rearward viewing camera disposed at a vehicle equipped with the vehicular trailer assist system and viewing at least a portion of a trailer hitched at a fifth wheel hitch at a bed of the vehicle. The rearward viewing camera captures fisheye-view frames of image data. The rearward viewing camera includes a CMOS imaging array having at least one million photosensors arranged in rows and columns. An electronic control unit (ECU) includes electronic circuitry and associated software that includes an image processor operable to process fisheye-view frames of image data captured by the rearward viewing camera. With the trailer hitched to the fifth wheel hitch at the bed of the vehicle, the vehicular trailer assist system, via image processing at the ECU of fisheye-view frames of image data captured by the rearward viewing camera, transforms fisheye-view frames of image data captured by the rearward viewing camera from fisheye-view frames of image data into bird's-eye view frames of image data. The vehicular trailer assist system determines a region of interest (ROI) in a transformed bird's-eye view frames of image data. The determined ROI includes a region of the transformed bird's-eye view frames of image data where the fifth wheel hitch is present. The vehicular trailer assist system, via a Hough transform that transforms the determined ROI from a Cartesian coordinate system to a polar coordinate system, determines the trailer hitched at the fifth wheel hitch and determines a trailer angle of the trailer relative to the vehicle.

These and other objects, advantages, purposes and features of the present invention will become apparent upon review of the following specification in conjunction with the drawings.

DESCRIPTION OF THE PREFERRED EMBODIMENTS

Figure 1:
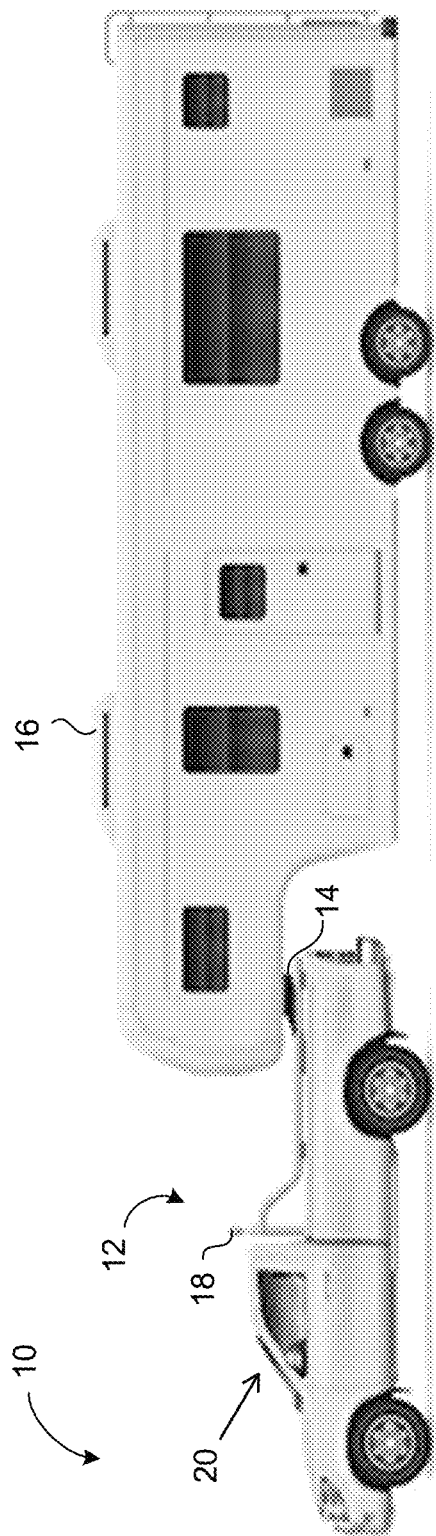
FIG. 1 is a plan view of a vehicle with a trailer assist system that is operable to determine a trailer angle of a trailer relative to a towing vehicle.

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Referring now to the drawings and the illustrative embodiments depicted therein, a vehicle 10 includes a trailer maneuver or guidance assist system or vehicular trailer assist system 12 that is operable to guide the vehicle or assist a driver of the vehicle in backing up or reversing with a hitched trailer 16. The trailer 16 is hitched to the vehicle 10 via, for example, a hitch 14. For example, the hitch couples the vehicle and trailer via a trailer coupler at the end of a trailer tongue hitching to a hitch ball of the hitch of the vehicle to establish a pivoting joint connection of the trailer to the vehicle, or via a trailer coupler hitching to a hitching mechanism located in a bed of the towing vehicle. The system 12 may guide and maneuver the vehicle 10 and trailer 16 toward a desired or selected location.

In the illustrated embodiment, the trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10 (FIG. 1). The field of view of the rearward viewing camera 18 includes the hitch 14 and/or trailer 16. The rearward viewing camera 18 includes a lens for focusing images at or onto an imaging array or imaging plane or imager of the camera. Optionally, the camera may be a center-high-mounted stop lamp (CHMSL) camera. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) 20 or processor that is operable to process image data captured by the camera or cameras and may detect objects or the like and/or provide displayed images at a display device for viewing by the driver of the vehicle (the control 20 and/or display device may be part of or incorporated in or at an interior rearview mirror assembly of the vehicle, or the control and/or the display device may be disposed elsewhere at or in the vehicle). The lens may comprise a wide angle or fisheye lens and the camera may capture fisheye-view frames of image data for processing at the ECU. The data transfer or signal communication from the camera to the ECU may comprise any suitable data or communication link, such as a vehicle network bus or the like of the equipped vehicle. The image data may be communicated to the ECU via a coaxial cable, such as by utilizing aspects of the systems described in U.S. Pat. Nos. 10,567,705; 10,313,572; 10,264,219; 10,154,185; 10,089,537; 10,071,687; 9,900,490 and/or 9,609,757, which are hereby incorporated herein by reference in their entireties.

Figure 2A:
FIGS. 2A and 2B are perspective views of towing vehicles towing bed-hitched trailers.
Figure 2B:
Figure 3A:
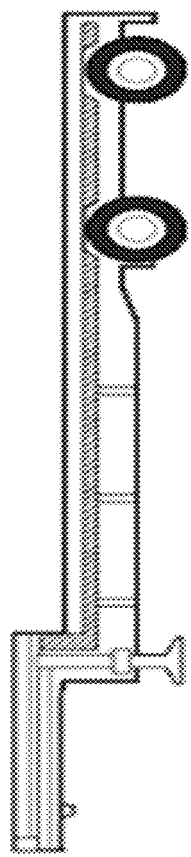
FIGS. 3A and 3B are perspective views of gooseneck trailers.
Figure 3B:
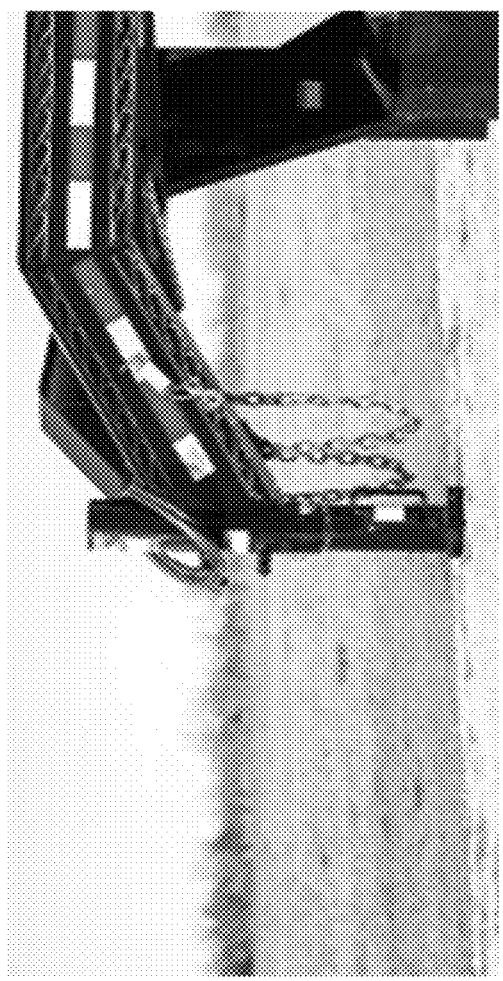
Figure 4:
FIG. 4 is a perspective view of a fifth wheel hitch.

Vision based detection and tracking of a trailer angle (i.e., the angle of a longitudinal axis of the trailer relative to a longitudinal axis of the vehicle measured, for example, at a hitch-point of the trailer to the vehicle) for nonconventional trailers such as gooseneck trailers (FIGS. 2A, 3A, and 3B) and fifth wheel campers (FIGS. 2B and 4) is crucial for trailer backup assistance systems and autonomous trailer parking features. The typical size and weight of these campers and trailers make maneuverability more difficult and dangerous than typical trailers. These trailers often need the help of an additional person for safe or effective operation because, unlike conventional trailers, fifth wheel trailers, gooseneck trailers, and the like are attached or hitched to the bed of the rear trunk of the towing vehicle (e.g., a pickup truck). The hitches used for connecting these trailers to the towing vehicle have three degrees of freedom which add to the complexity of operation of these trailers.

Figure 5A:
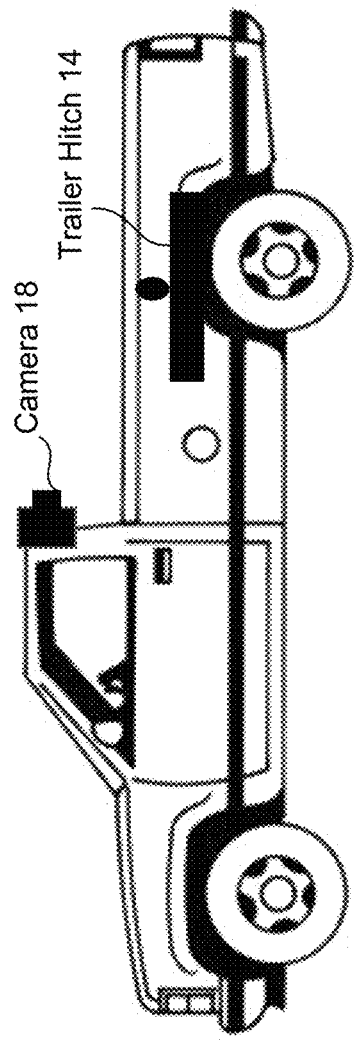
FIG. 5A is a schematic view of a vehicle equipped with a center high-mounted stop lamp camera.

As described further below, a vehicular trailer guidance system 12 includes contactless vision sensor-based detection of the trailer angle relative to the vehicle using one or more CHMSL cameras 18 of a towing vehicle (FIG. 5A). The CHMSL camera(s) are mounted, for example, at or on or near the top or roof of the towing vehicle and overlook the rear bed of the towing vehicle. Thus, the CHMSL camera 18 has a field of view rearward of the vehicle and optionally downward from the roof or upper portion of the cab of the vehicle (with the rearward view of the CHMSL camera being different than a rearward view of a rear backup camera of the vehicle). The CHMSL camera 18 views at least a portion of the hitch 14 of the vehicle and, when the trailer 16 is hitched to vehicle e.g., via a trailer hitch 14 within a bed of the vehicle), at least a portion of the hitch and body of the trailer. Herein, a trailer refers to any vehicle that is configured to be towed such as a camper or recreational vehicle. The system uses (i.e., processes) image data captured by the CHMSL camera 18 to detect and calculate the trailer angle of the trailer 16.

Figure 5B:
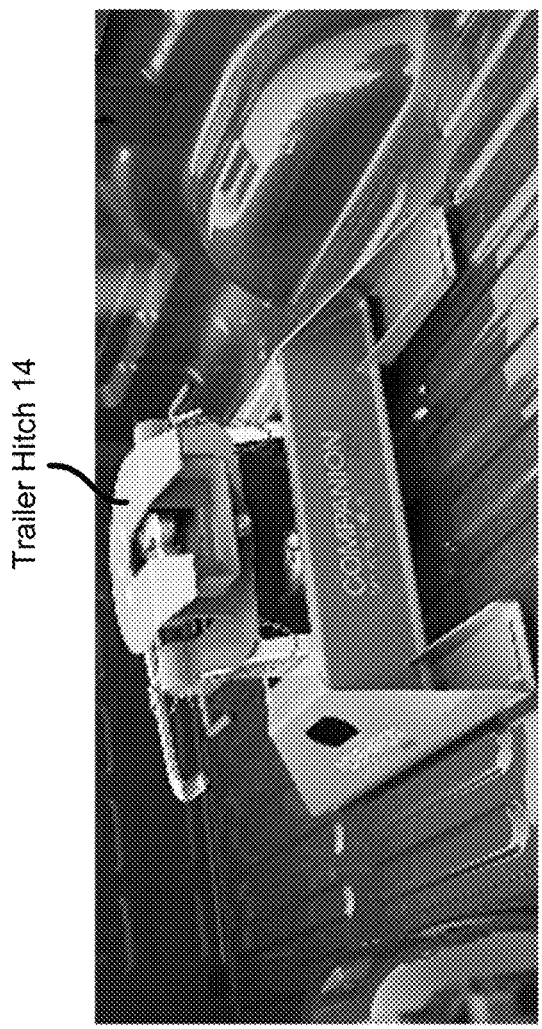
FIG. 5B is a perspective view of a bed-mounted hitch.

The system may accommodate different height and shaped trailers, hitches, and towing vehicles. The system may also cater to various illumination conditions (e.g., full sun, shade, dusk, night, etc.). The system is capable of working with all types of hitch types (i.e., both fixed and moving hitch types). The system may support two or more degrees of motion and also cater to tilt in the hitch at various angles. The system may also support trailer angles up to 90 degrees on either side of the vehicle (i.e., the longitudinal axis of the trailer is perpendicular to the longitudinal axis of the vehicle). The system implements a technique to resolve the various challenges that face hitching and towing bedhitched trailers such as fifth wheels, goosenecks, etc. (FIG. 5B) to accurately determine the trailer angle.

Figure 6:
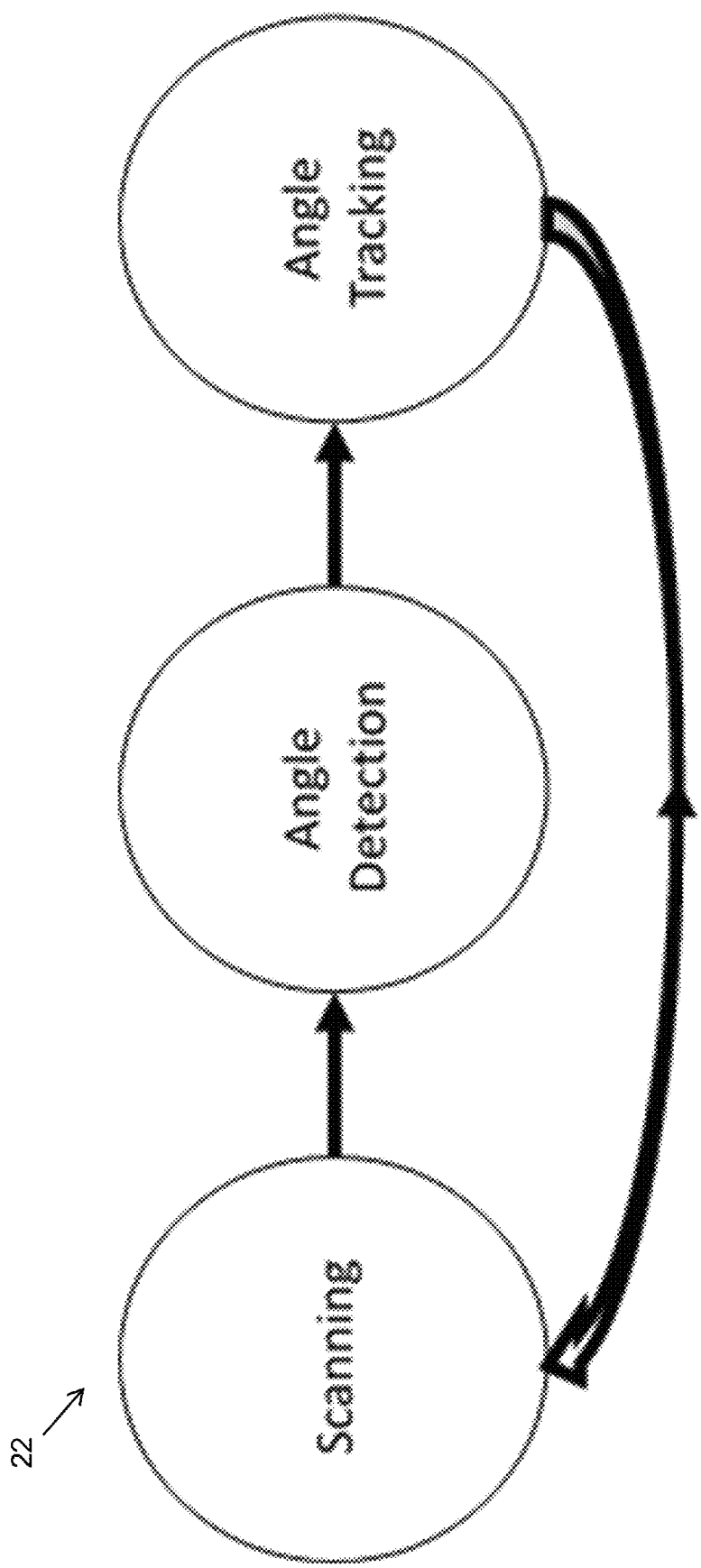
FIG. 6 is a block diagram of a technique for determining the trailer angle relative to the vehicle.

Referring now to FIG. 6, the system may execute a trailer angle detection (TAD) system 22. The TAD system 22 may include a scanning state, an angle detection state, and an angle tracking state. Initially, the system may assume that the vehicle and trailer are in a straight position with the trailer angle at or near zero degrees (i.e., the towing vehicle and the trailer are aligned) and a region of interest (ROI) has been selected from the initial stored location. The ROI may be selected to include features of the towing vehicle, the hitch of the vehicle, the trailer, the trailer coupler of the trailer, and any other identifiable features that may assist in recognizing the positioning of the trailer and the towing vehicle relative to one another in the captured image data.

In the scanning state, the system may assume that the initial trailer angle is within a threshold of zero degrees (e.g., plus or minus five degrees). The system captures a frame of image data from the CHMSL camera and transforms the frame of image data to a top view. In other words, the system receives image data captured by the CHMSL camera, which has a field of view rearward and downward from the upper portion of the vehicle (such as the roof of the cab of the vehicle) and processes the image data to provide an input image that represents a top-down or bird's-eye-view of the trailer and hitch area at the bed of the truck. Optionally, the input image size may have a resolution of 640×400. A predefined ROI may be selected from a configuration file (e.g., stored in nonvolatile memory disposed within the towing vehicle) for the initial frame of the top view image to send to new modules.

Figure 7:
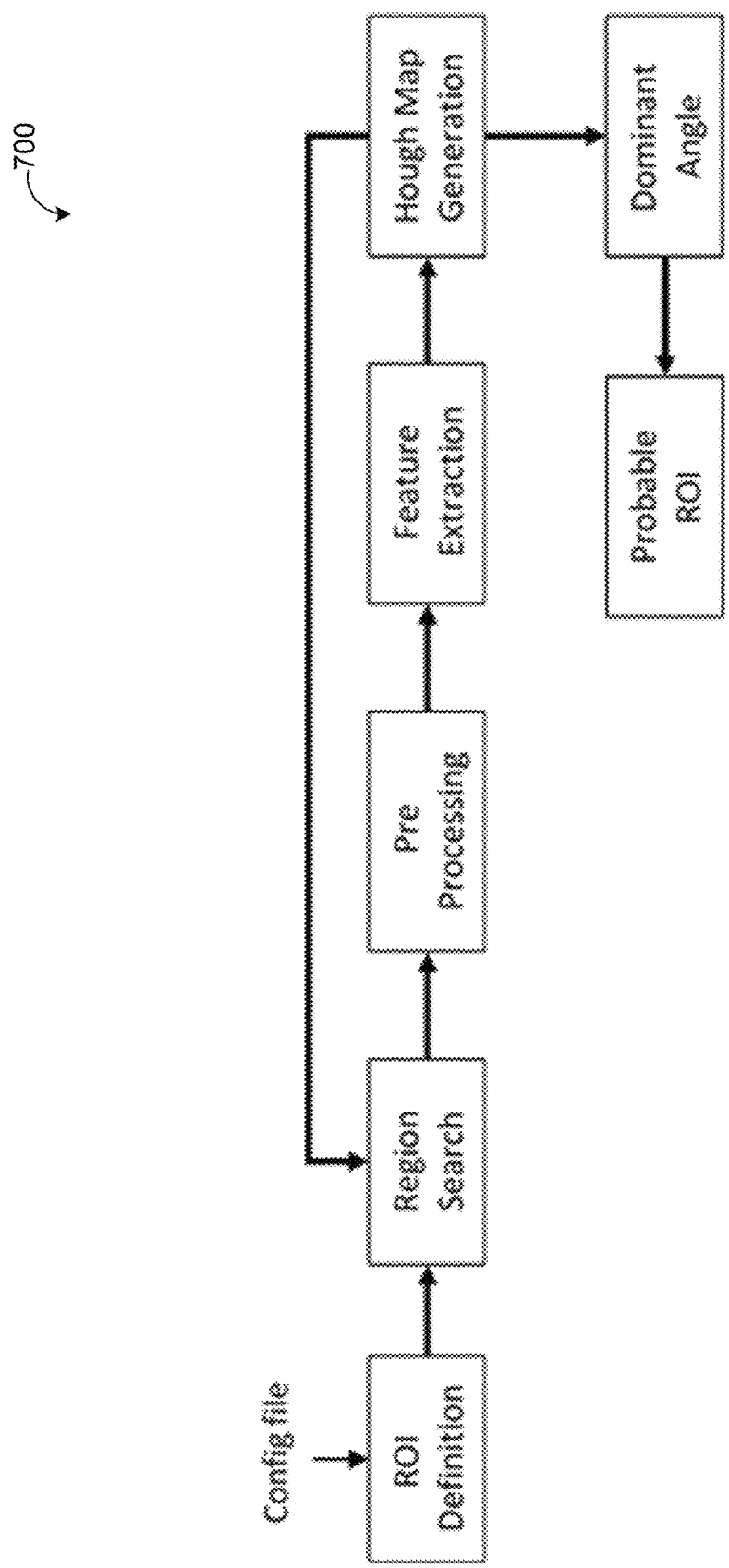
FIG. 7 is a block diagram for determining a region of interest for determining the trailer angle relative to the vehicle using the technique of FIG. 6.

Referring now to FIG. 7, block diagram 700 illustrates an exemplary flow for ROI definition. Here, the system begins when the predefined ROI is selected from the input image based on a set of dimensions such as the center point and width and height of the ROI. After the vehicle begins moving and the trailer angle begins to change, a new center point along with detected trailer angle values are provided to the ROI selection module. If a detected trailer angle value is different than zero degrees (or not within a threshold amount of zero degrees), then, based on the center point and size of the ROI, a new ROI is transformed to the horizontal ROI. The same ROI may be sent to the further modules.

Figure 8:
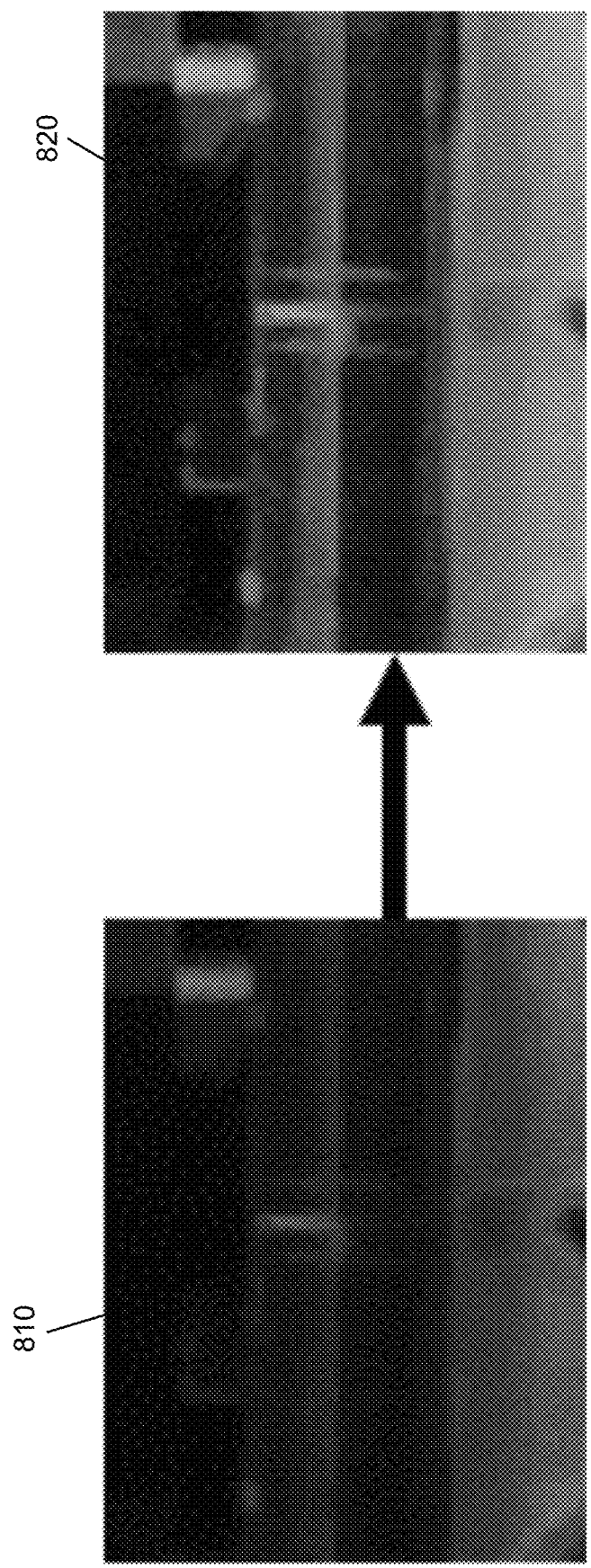
FIG. 8 is an example of preprocessing a frame of image data for the technique of FIG. 6.

The angle detection state may be divided into different modules such as a preprocessing module, a feature extraction module, and a Hough based angle detection module. Because image data is captured by the CHMSL camera in various environments, the input images may be preprocessed in order to enhance the quality of the images. The entirety of the input image may be preprocessed or, for example, the system may crop the image data to include only the ROI and preprocess only the cropped portion of the input image including the ROI. The cropped ROI may consist of the features of the hitch and coupler area connecting the trailer to the vehicle. For example, the brightness of the input images may be improved at the cropped ROI with advanced gamma correction techniques (FIG. 8) or using other image processing techniques. As shown in FIG. 8, the exemplary cropped ROI image 810 is processed to improve brightness and output an improved brightness image 820.

Figure 9:
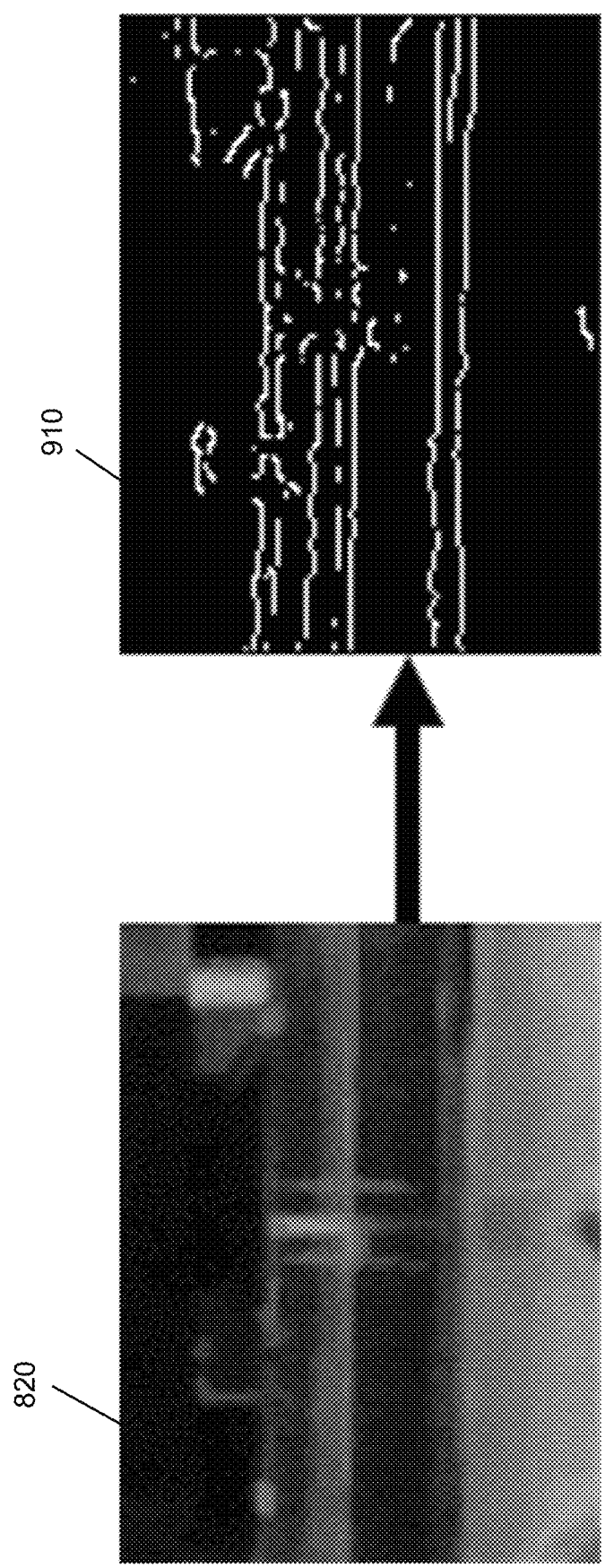
FIG. 9 is an example of feature extraction from a frame of image data for the technique of FIG. 6.

In order to acquire or recognize or determine the required features of the ROI, edges of objects within the frames of image data play an important role. In other words, it is important for the edges of objects within the captured image data to be substantially recognizable or distinct or distinguishable from other objects or background of the captured image data. A horizontal direction-based Canny edge detector may be applied to identify edges for recognizing or acquiring the relevant features from the predefined ROI (FIG. 9). As shown in FIG. 9, the improved brightness image 820 is processed to identify edges within the image data and output a Canny edge image 910.

Figure 10:
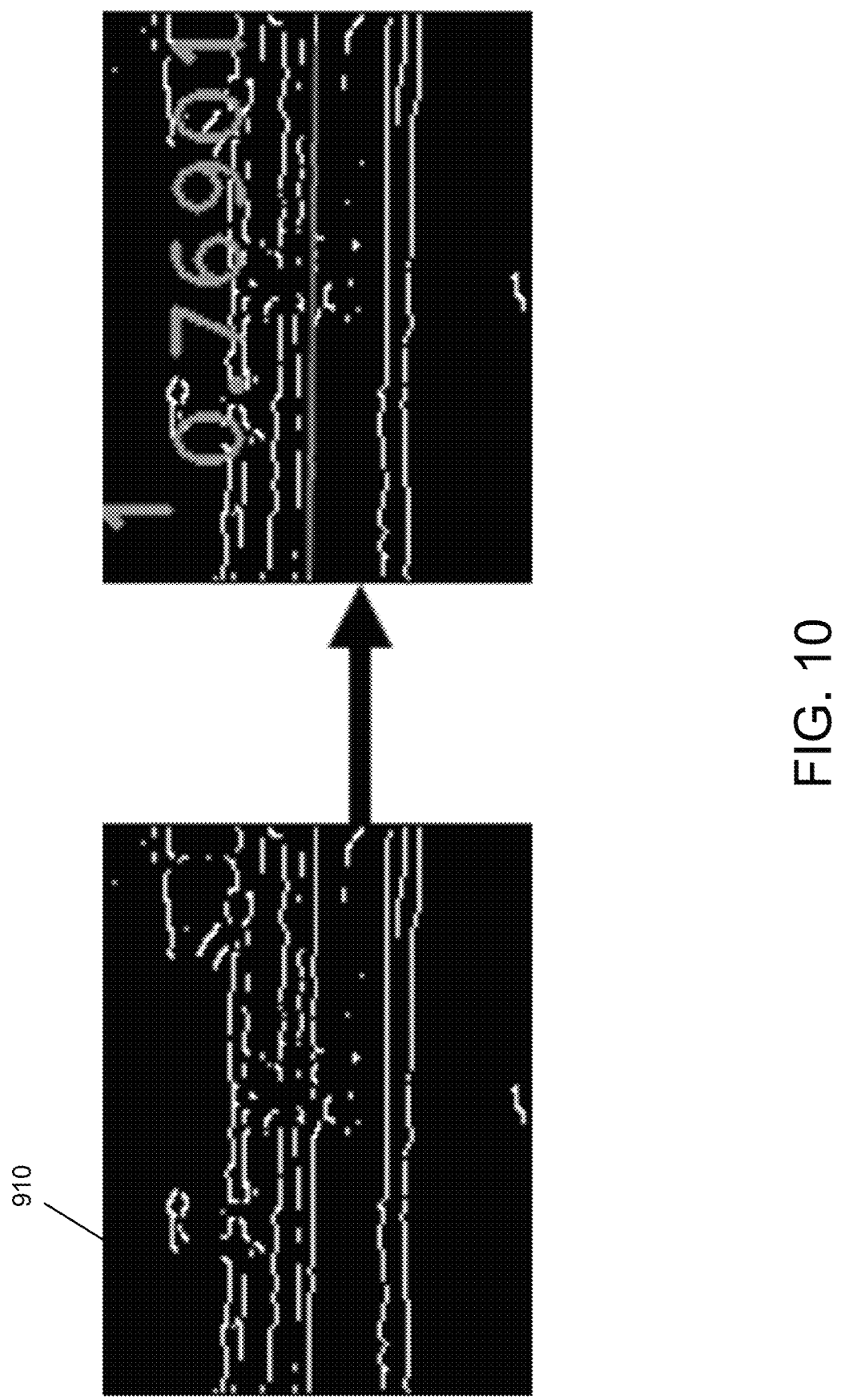
FIG. 10 is an example of angle detection using a Hough transform on the extracted features of FIG. 10.

In the angle detection module, the Canny edge image 910 may be applied as an input and the features of the cropped ROI may be determined (FIG. 10). The features of the cropped ROI may be sent to the Hough line transform module. The Hough line transform module converts, using a Hough transform, the features from an X, Y map to a Hough map consisting of rho and theta. Based on the Hough map, strong Hough features out of a Hough accumulator may be selected as a part of trailer angle detection. The Hough features may be stored for the tracking module.

Figure 11:
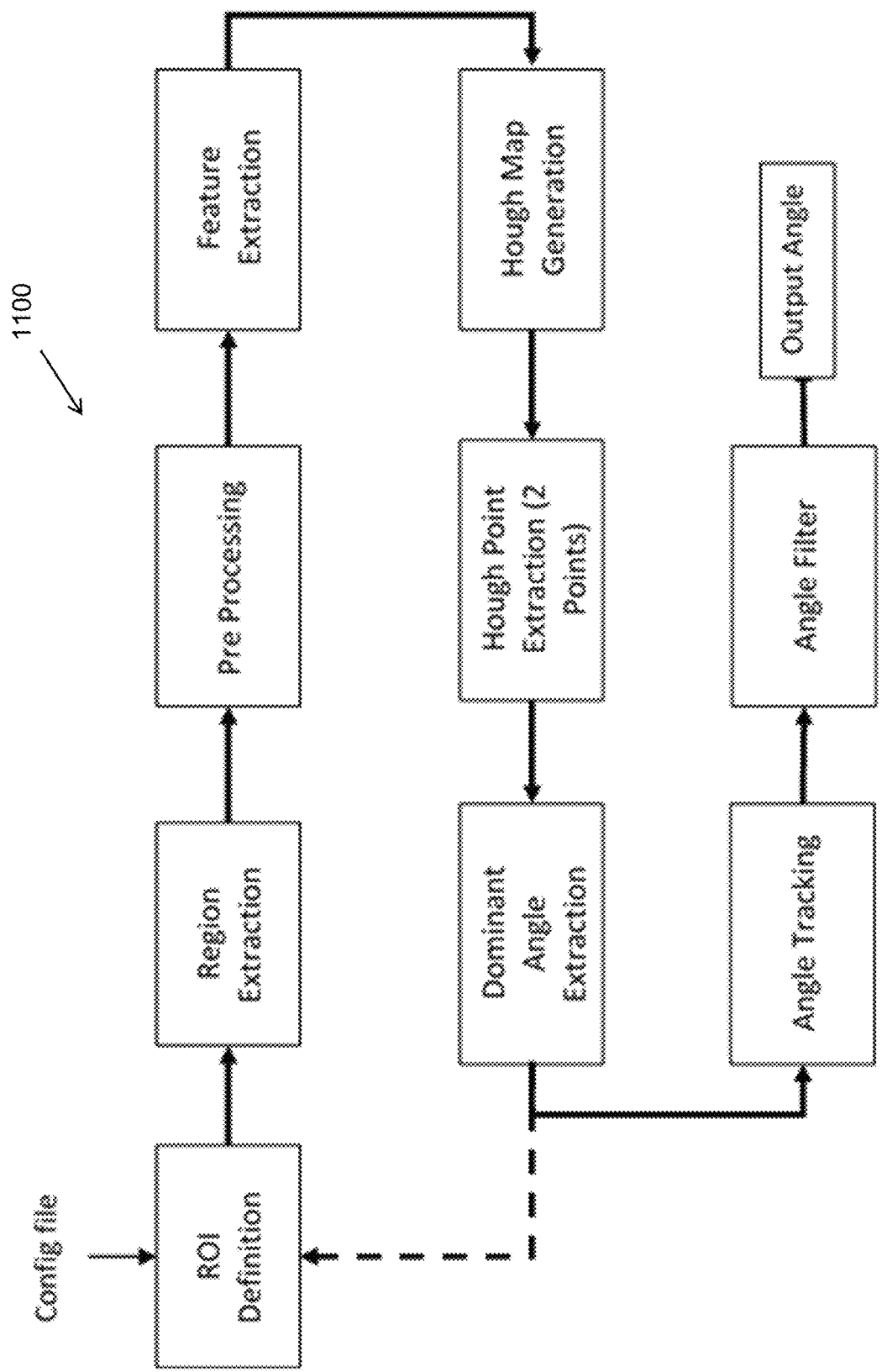
FIG. 11 is a block diagram for angle detection and tracking for the technique of FIG. 6.

Referring now to FIG. 11, block diagram 1100 represents an exemplary flow of the Hough based angle tracking module. The angle tracking module may be based on the rho and theta values from the Hough accumulator. Based on the Hough accumulator and the cropped ROI, the system may automatically select the new ROI. When the angle is detected from Hough line detection module, the system may update the previous trailer angle with the new angle. The angle difference between the consecutive frames may be noted and/or stored (i.e., the difference between the old trailer angle and the new trailer angle). Based on the rho and theta values, the system may select a new ROI and send the new ROI to the ROI selection module. The system may repeat the same technique to each captured frame of image data to track the current trailer angle.

Thus, implementations herein provide a contactless vision sensor-based detection of trailer angles for bed-hitched trailers (such as gooseneck trailers and fifth wheel campers). The system uses a CHMSL camera to capture image data that at least partially includes the coupler hitching the trailer to the vehicle and includes a technique for detecting and tracking the trailer angle relative to the vehicle based on the image data captured by the CHMSL camera. The system may provide the determined trailer angle to other vehicular trailer guidance systems such as systems for guiding a reversing maneuver of the trailer.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2021-0170947; US-2021-0170820; US-2021-0078634; US-2020-0406967; US-2020-0361397; US-2020-0356788; US-2020-0334475; US-2020-0017143; US-2019-0118860; US-2019-0064831; US-2019-0039649; US-2018-0276838; US-2018-0215382; US-2017-0254873 and/or US-2017-0217372, and/or U.S. patent application Ser. No. 17/443,258, filed Jul. 23, 2021, now U.S. Pat. No. 11,861,878, Ser. No. 17/443,257, filed Jul. 23, 2021, now U.S. Pat. No. 11,702,017, Ser. No. 17/443,256, filed Jul. 23, 2021, now U.S. Pat. No. 11,875,575, and/or Ser. No. 17/643,596, filed Dec. 10, 2021, now U.S. Pat. No. 11,989,902, and/or U.S. provisional application Ser. No. 63/199,538, filed Jan. 7, 2021, and/or U.S. provisional application Ser. No. 63/199,513, filed Jan. 5, 2021, and/or International Publication No. WO 2021/0127693, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer assist system, the vehicular trailer assist system comprising:
   a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;
   wherein the rearward viewing camera comprises a CMOS imaging array having at least one million photosensors arranged in rows and columns;

an electronic control unit (ECU) comprising electronic circuitry and associated software, wherein the electronic circuitry comprises an image processor operable to process fisheye-view frames of image data captured by the rearward viewing camera;

wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;

wherein the vehicular trailer assist system determines a region of interest (ROI) in transformed bird's-eye view frames of image data;

wherein the determined ROI includes a region of the transformed bird's-eye view frames of image data where the fifth wheel hitch is present; and wherein, with the trailer hitched to the fifth wheel hitch at the bed of the vehicle, the vehicular trailer assist system, via a Hough transform that transforms the determined ROI from a Cartesian coordinate system to a polar coordinate system, determines the trailer hitched at the fifth wheel hitch and determines a trailer angle of the trailer relative to the vehicle.

2. The vehicular trailer assist system of claim 1, wherein the rearward viewing camera is disposed at a center high-mounted stop lamp (CHMSL) of the vehicle.

3. The vehicular trailer assist system of claim 1, wherein the vehicular trailer assist system, responsive to transforming the fisheye-view frames of image data into the bird's-eye view frames of image data, preprocesses the transformed bird's-eye view frames of image data.

4. The vehicular trailer assist system of claim 3, wherein the preprocessing comprises gamma correction techniques.

5. The vehicular trailer assist system of claim 1, wherein, with the trailer hitched to the fifth wheel hitch at the bed of the vehicle, the vehicular trailer assist system extracts features from the determined ROI, and wherein the extracted features are transformed via the Hough transform, and wherein, based on the Hough transform of the extracted features, the vehicular trailer assist system determines the trailer hitched at the fifth wheel hitch and determines the trailer angle of the trailer relative to the vehicle.

6. The vehicular trailer assist system of claim 5, wherein the vehicular trailer assist system extracts features from the determined ROI based on a Canny edge detection algorithm.

7. The vehicular trailer assist system of claim 6, wherein the Canny edge detection algorithm comprises a horizontal direction-based Canny edge detection algorithm.

8. The vehicular trailer assist system of claim 1, wherein the vehicular trailer assist system, responsive to determining the trailer angle of the trailer relative to the vehicle, updates the determined ROI based on the determined trailer angle.

9. The vehicular trailer assist system of claim 1, wherein the vehicular trailer assist system tracks the trailer angle in consecutive frames of image data captured by the rearward viewing camera.

10. The vehicular trailer assist system of claim 9, wherein the vehicular trailer assist system determines an angle difference between trailer angles in consecutive frames of image data captured by the rearward viewing camera and updates the determined ROI based on the determined angle difference between trailer angles in consecutive frames of image data.

11. The vehicular trailer assist system of claim 1, wherein the trailer comprises a gooseneck trailer or a fifth wheel trailer.

12. The vehicular trailer assist system of claim 1, wherein the vehicular trailer assist system determines an updated trailer angle based on subsequent frames of image data captured by the rearward viewing camera, and wherein the vehicular trailer assist system determines a difference between a previous trailer angle and the updated trailer angle.

13. A vehicular trailer assist system, the vehicular trailer assist system comprising:

a rearward viewing camera disposed at a center high-mounted stop lamp (CHMSL) of a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;

wherein the rearward viewing camera comprises a CMOS imaging array having at least one million photosensors arranged in rows and columns;

an electronic control unit (ECU) comprising electronic circuitry and associated software, wherein the electronic circuitry comprises an image processor operable to process fisheye-view frames of image data captured by the rearward viewing camera;

wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;

wherein the vehicular trailer assist system determines a region of interest (ROI) in transformed bird's-eye view frames of image data;

wherein the determined ROI includes a region of the transformed bird's-eye view frames of image data where the fifth wheel hitch is present;

wherein the vehicular trailer assist system extracts features from the determined ROI;

wherein the vehicular trailer assist system transforms the extracted features via a Hough transform; and wherein the vehicular trailer assist system, based on the Hough transform of the extracted features, determines a trailer angle of the trailer relative to the vehicle.

14. The vehicular trailer assist system of claim 13, wherein the vehicular trailer assist system, responsive to transforming the fisheye-view frames of image data into the bird's-eye view frames of image data, preprocesses the transformed bird's-eye view frames of image data.

15. The vehicular trailer assist system of claim 14, wherein the preprocessing comprises gamma correction techniques.

16. The vehicular trailer assist system of claim 13, wherein the vehicular trailer assist system extracts features from the determined ROI based on a Canny edge detection algorithm.

17. The vehicular trailer assist system of claim 16, wherein the Canny edge detection algorithm comprises a horizontal direction-based Canny edge detection algorithm.

18. A vehicular trailer assist system, the vehicular trailer assist system comprising:

a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;

wherein the rearward viewing camera comprises a CMOS imaging array having at least one million photosensors arranged in rows and columns;

an electronic control unit (ECU) comprising electronic circuitry and associated software, wherein the electronic circuitry comprises an image processor operable to process fisheye-view frames of image data captured by the rearward viewing camera;

wherein, with the trailer hitched to the fifth wheel hitch at the bed of the vehicle, the vehicular trailer assist system, via image processing at the ECU of fisheye-view frames of image data captured by the rearward viewing camera, transforms fisheye-view frames of image data captured by the rearward viewing camera from fisheye-view frames of image data into bird's-eye view frames of image data;

wherein the vehicular trailer assist system determines a region of interest (ROI) in transformed bird's-eye view frames of image data;

wherein the determined ROI includes a region of the transformed bird's-eye view frames of image data where the fifth wheel hitch is present;

wherein the vehicular trailer assist system, via a Hough transform that transforms the determined ROI from a Cartesian coordinate system to a polar coordinate system, determines the trailer hitched at the fifth wheel hitch and determines a trailer angle of the trailer relative to the vehicle;

wherein the vehicular trailer assist system, responsive to determining the trailer angle of the trailer relative to the vehicle, updates the determined ROI based on the determined trailer angle; and wherein the vehicular trailer assist system, using the updated determined ROI, tracks the trailer angle in consecutive frames of image data captured by the rearward viewing camera.

19. The vehicular trailer assist system of claim 18, wherein the trailer comprises a gooseneck trailer or a fifth wheel trailer.

20. The vehicular trailer assist system of claim 18, wherein the vehicular trailer assist system, when tracking the trailer angle in consecutive frames of image data captured by the rearward viewing camera, determines an updated trailer angle based on subsequent frames of image data captured by the rearward viewing camera, and wherein the vehicular trailer assist system determines a difference between a previous trailer angle and the updated trailer angle.

* * * * *